US009199366B2

(12) United States Patent
Valler et al.

(10) Patent No.: US 9,199,366 B2
(45) Date of Patent: Dec. 1, 2015

(54) MOIL GUIDE

(75) Inventors: Gregory Oliver Valler, Toowoomba (AU); Peter John Rubie, Toowoomba (AU)

(73) Assignee: Russell Mineral Equipment Pty Ltd, Glenvale, Toowoomba, Queensland (AU)

( * ) Notice: Subject to any disclaimer, the term of this patent is extended or adjusted under 35 U.S.C. 154(b) by 755 days.

(21) Appl. No.: 13/395,180

(22) PCT Filed: Sep. 10, 2010

(86) PCT No.: PCT/AU2010/001171

§ 371 (c)(1), (2), (4) Date: May 29, 2012

(87) PCT Pub. No.: WO2011/029147

PCT Pub. Date: Mar. 17, 2011

(65) Prior Publication Data

US 2012/0242049 A1 Sep. 27, 2012

(30) Foreign Application Priority Data

Sep. 11, 2009 (AU) ................................ 2009904397

(51) Int. Cl.

| | |
|---|---|
| ***B23B 31/28*** | (2006.01) |
| ***B25B 27/18*** | (2006.01) |
| ***B25B 23/00*** | (2006.01) |
| ***B25D 17/00*** | (2006.01) |

(52) U.S. Cl.

CPC ................. *B25B 27/18* (2013.01); *B25B 23/00* (2013.01); *B25D 17/00* (2013.01); *B25D 2250/171* (2013.01); *Y10T 279/23* (2015.01)

(58) Field of Classification Search

CPC ........ B23B 31/28; B23B 27/18; Y10T 279/23

USPC .......... 173/1, 91, 13, 128, 206, 208; 279/128; 29/252

See application file for complete search history.

(56) References Cited

U.S. PATENT DOCUMENTS

| | | | | |
|---|---|---|---|---|
| 4,805,495 | A | 2/1989 | Tauber | |
| 6,471,273 | B1 * | 10/2002 | Friedrich et al. | 294/65.5 |
| 6,904,980 | B2 | 6/2005 | Rubie | |
| 7,331,262 | B2 * | 2/2008 | Petit et al. | 81/438 |
| 7,548,147 | B2 * | 6/2009 | Chiang | 335/285 |
| 2004/0140113 | A1 | 7/2004 | Rubie | |
| 2009/0126177 | A1 * | 5/2009 | Coray | 29/254 |
| 2010/0213657 | A1 * | 8/2010 | Sladojevic | 269/8 |

FOREIGN PATENT DOCUMENTS

| | | |
|---|---|---|
| CN | 2828794 | 10/2006 |
| WO | 9726116 | 7/1997 |
| WO | 2007000019 A1 | 1/2007 |

OTHER PUBLICATIONS

International Search Report received in corresponding PCT patent application No. PCT/AU2010/001171, mail date Nov. 8, 2010.

* cited by examiner

*Primary Examiner* — Hemant M Desai
*Assistant Examiner* — Nathaniel Chukwurah
(74) *Attorney, Agent, or Firm* — Blank Rome, LLP

(57) ABSTRACT

A moil guide having a sleeve that has an opening adapted to receive at least a portion of a linerbolt. The moil guide also has a magnetic attachment device attached to the sleeve. The magnetic attachment device is operable to selectively generate a magnetic field. The magnetic attachment device is operable to selectively generate the magnetic field to removably attach the moil guide to a metal surface.

7 Claims, 5 Drawing Sheets

MOIL GUIDE

FIELD OF THE INVENTION

This invention relates to a moil guide for guiding the hammer moil of a linerbolt removal tool onto a bolt to be removed from a liner secured to a mill casing.

BACKGROUND TO THE INVENTION

Liner bolts are typically used to secure sacrificial liners to the internal casing of mills used in the mining industry. The sacrificial liners are routinely replaced during maintenance of the mills. Typically such mills may range in size from three meters to eleven meters in diameter and are lined with replaceable heavy steel segments attached internally to the mill casing by through bolting using liner bolts. The liner bolts typically have a diameter of up to about 50 mm.

In such applications, the bolts become corroded and clearances between bolts and holes become compacted with ore fines. This results in difficult bolt removal at liner removal time. As a result the many liner bolts that are utilized to attach the liners to the mill shell are often required to be freed manually by the use of large sledge-hammers. This is a difficult and time-consuming task that may result in injury to the workers.

While it is well known to use percussive devices such as jack-hammers and hydraulically powered hammers to provide repetitive impacts for many applications, they are not able to be manually guided into alignment with wall mounted bolts and other components. The applications of jack hammers are limited as the hammering effect produced by an electrically or pneumatically operated jack hammer does not provide the impact as would be provided by a sledge hammer, for example.

In known hammering devices capable of delivering such impacts, a high reaction force is produced which necessitates that such devices be carried by articulating machines or be rigidly attached to some support structure. This reduces their versatility and makes them unsuitable for many applications. Furthermore, it is difficult to quickly and accurately align such devices with the shank of a bolt or the like for effecting ready removal thereof.

International publication WO97/26116 (Russell Mineral Equipment Pty Ltd) describes a hydraulic linerbolt removal tool. The hydraulic tool essentially comprises a housing having a moil mounted at the forward end and a hydraulic piston assembly reciprocally moveable along the hammer axis between a striking position at which the piston assembly strikes the impact delivery member and a retracted position remote from the impact delivery member. A firing means is provided for hydraulically firing the piston assembly from its retracted position to its striking position under the control of actuating means. A reactive body assembly is moveable in the direction of the hammer axis by driving means towards the impact delivery member prior to operation of the firing means whereby the reactive body assembly may be energized by movement and subsequently decelerated to substantially absorb the reaction generated by firing the piston assembly. Recoil is thus reduced whereby the apparatus may be operated by hand with the apparatus being suspended about its centre of gravity at the work site.

U.S. Pat. No. 6,904,980 (Rubie) describes a pneumatic liner bolt removal tool that is operable from a conventional compressed air supply.

A disadvantage with using such prior art liner bolt removal tools to remove conventional liner bolts, is that it is necessary for the operator of the removal tool be assisted by a workman who helps align the moil of the removal tool with the liner bolt, typically by use of a hand-held moil guide. This is because even though the removal tools are suspended, their size and weight makes them difficult to handle and they obstruct the operator's view of the work area. This places the workman assisting the operator of the liner bolt removal tool at risk of injury, due to his proximity to the working end of the tool as it is aligned with the liner bolt.

OBJECT OF THE INVENTION

It is an object of the invention to overcome or at least alleviate one or more of the above problems and/or provide the consumer with a useful or commercial alternative.

SUMMARY OF THE INVENTION

In one form, although it need not be the only or indeed the broadest form, the invention resides in a moil guide comprising:

a sleeve having an opening adapted to receive at least a portion of a bolt; and a magnetic attachment device attached to the sleeve, the magnetic attachment device operable to selectively generate a magnetic field;

wherein, the magnetic attachment device is operable to selectively generate the magnetic field to removably attach the moil guide to a metal surface.

Preferably, the magnetic attachment device is a mechanically activated magnet comprising a lever operable to selectively generate the magnetic field to removably attach the moil guide to the metal surface.

Alternatively, the magnetic attachment device is an electronically activated magnet comprising a switch operable to selectively generate the magnetic field to removably attach the moil guide to the metal surface.

Suitably, the sleeve has a further opening adapted to receive a moil of a bolt removal tool.

Preferably, the moil guide of claim 1 further comprising a recess in the sleeve proximal the opening.

Optionally, the magnetic attachment device is attached to the sleeve by way of a flexible membrane.

In a further form, the invention resides in a moil guide for guiding a hammer moil of a linerbolt removal tool onto a bolt to be removed from a liner secured to a mill casing, the moil guide comprising:

a sleeve connected to a magnetic attachment device;

wherein, the sleeve is placed over the bolt to provide a guide for the hammer moil and the magnetic attachment device is removably attached to the mill casing.

In still a further form, the invention resides in a method of removing a liner bolt from a liner secured to a mill casing, the method including the steps of:

locating an end of the liner bolt at least partially within a sleeve of a moil guide;

magnetically attaching the moil guide to the mill casing to thereby maintain the liner bolt at least partially within the sleeve of the moil guide;

locating a moil hammer within the sleeve through a further opening in the sleeve such that the moil hammer is in contact with the end of the liner bolt; and operating the moil hammer on the liner bolt to thereby drive the liner bolt from the liner and the mill casing.

DETAILED DESCRIPTION OF THE INVENTION

Figure 1:
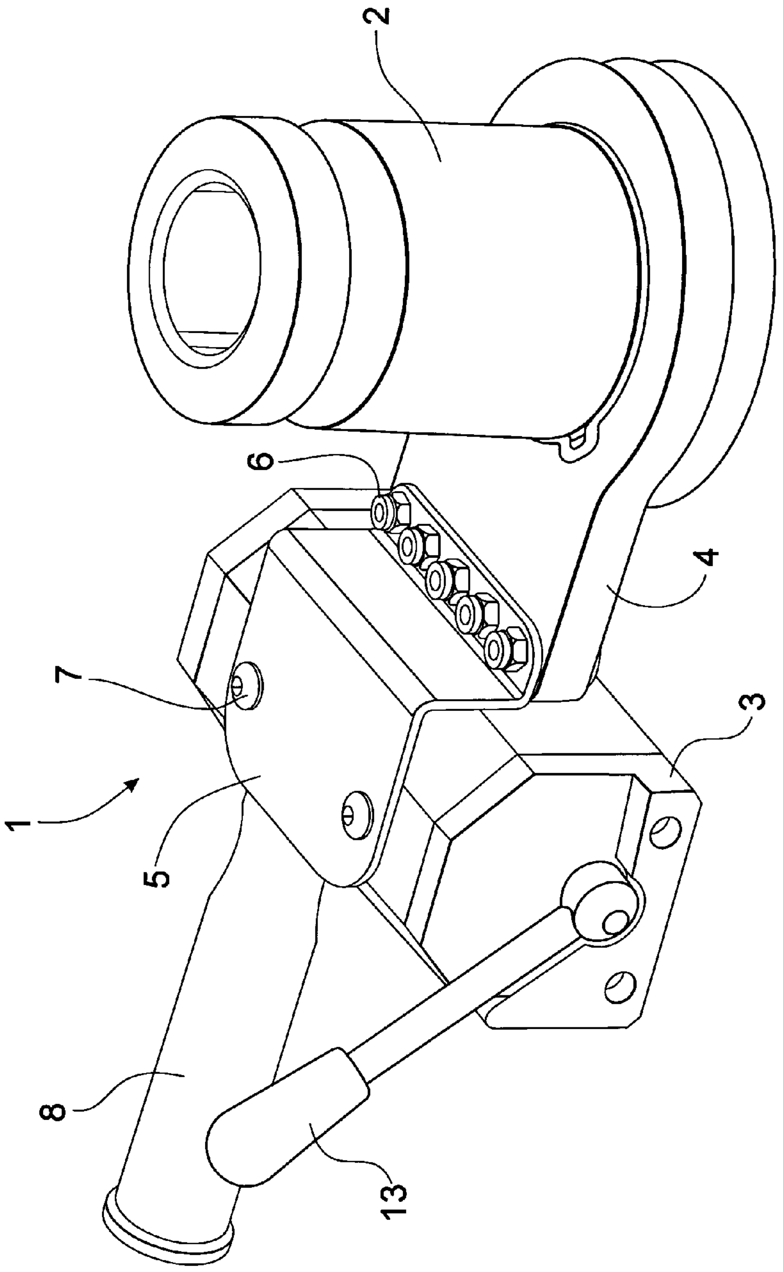
FIG. 1 shows a perspective view of a moil guide according to an embodiment of the invention.
Figure 2:
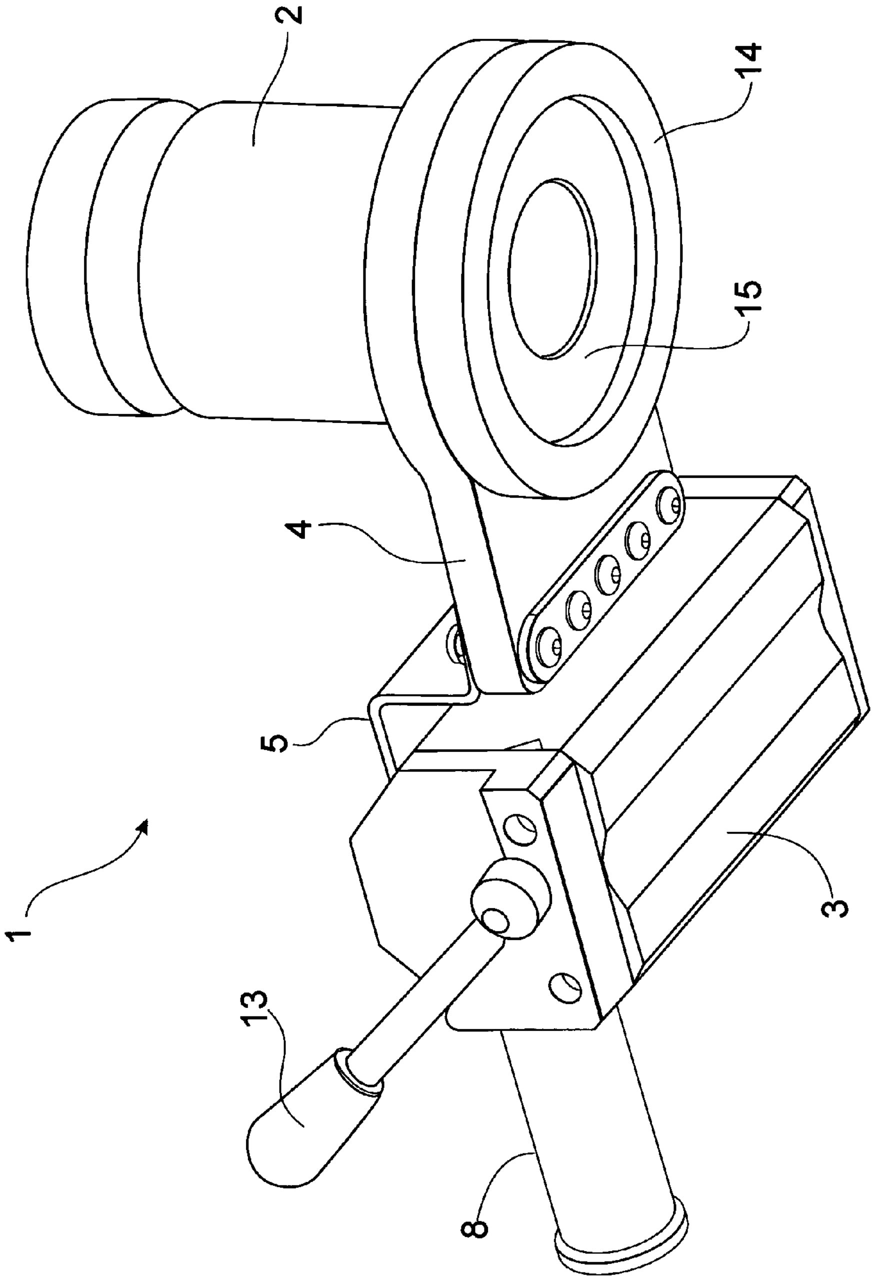
FIG. 2 shows a reverse perspective view of the moil guide shown in FIG. 1.

FIG. 1 and FIG. 2 show a moil guide 1 in accordance with an embodiment of the invention. Moil guide 1 comprises a sleeve 2, a magnetic attachment device which, in the embodiment, is in the form of a mechanically activated magnet 3 and a flexible (rubber) membrane 4. An attachment bracket 5 is used to interconnect membrane 4 to mechanically activated magnet 3 via fasteners 6, 7. A handle 8 is integrally formed or attached to attachment bracket 5.

Figure 3:
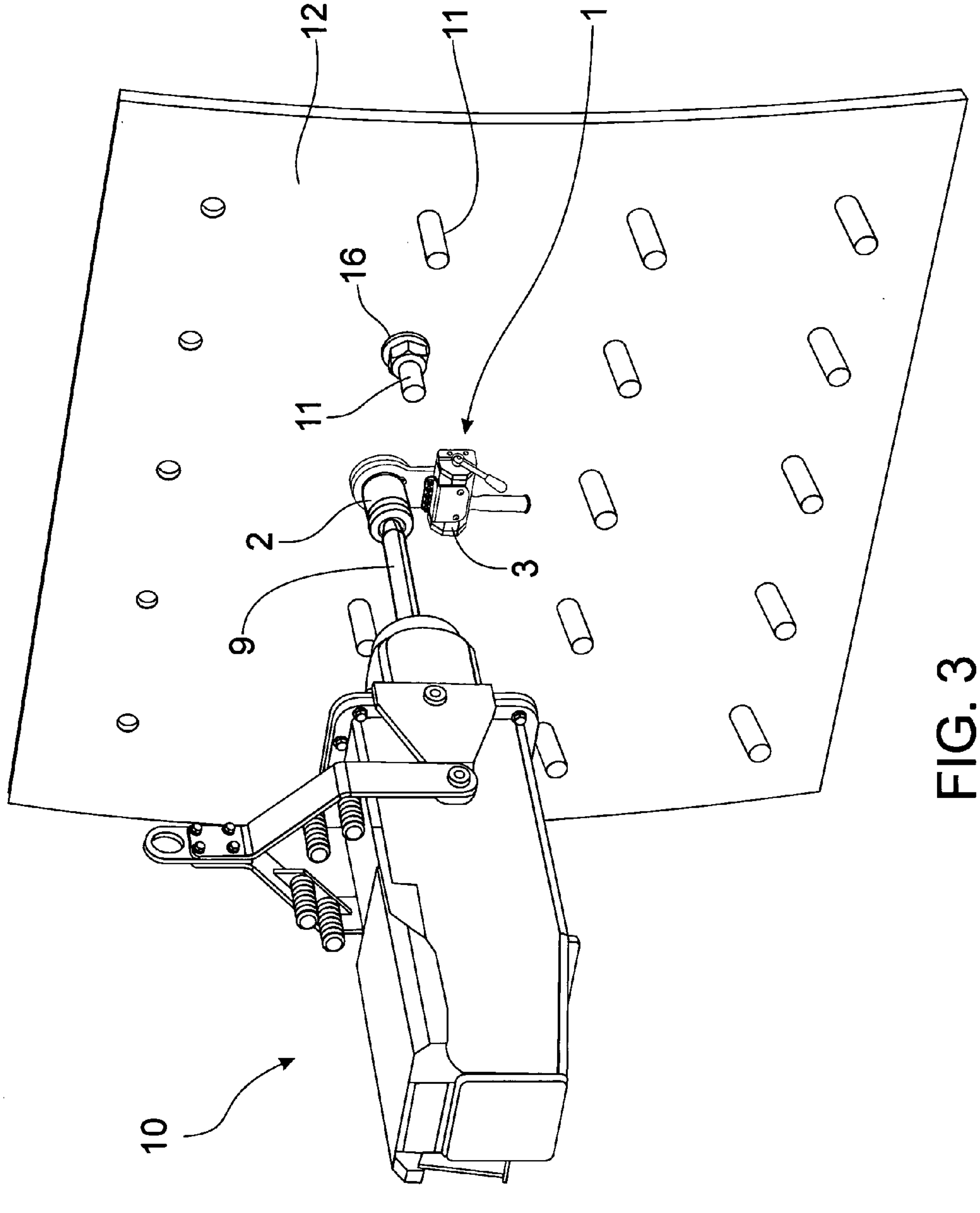
FIG. 3 shows a perspective view of the moil guide of FIG. 1 in use.

FIG. 3, shows a linerbolt removal tool 10, and a mill casing 12, with a plurality bolts 11. In use, sleeve 2 of moil guide 1 is placed over a bolt 11 and extends past the bolt to provide a guide for hammer moil 9 of linerbolt removal tool 10. As such, an end portion of bolt 11 is received though an opening in the sleeve 2.

The mechanically activated magnet 3 is abutted against mill casing 12 and, in the embodiment, mechanically operated by movement of its lever 13 to selectively generate a magnetic field to thereby removably attach the moil guide 1 to a surface of the mill casing 12 in view of the fact that mill casing 12 is formed from a metal material.

The moil 9 is then located within sleeve 2 through an opening distal to the opening through with the liner bolt 11 is located. In this way, the moil 9 is able to contact an end face of the liner bolt 11. The moil 9 is then operated to drive the liner bolt from the liner and the mill casing.

Flexible membrane 4 minimizes (or eliminates) the impact on sleeve 2 being transmitted to the mechanically activated magnet 3 and also allows sleeve 2 to adapt to the angle of bolt 11.

Mechanically activated magnet 3 must be of sufficient strength to prevent movement of moil 9 once bolt 11 has been knocked into mill casing 12 and can no longer support sleeve 2. A preferred magnet rating is about 250 kg to 759 kg.

A recess 15 in the end 14 of the sleeve 2 is capable of accommodating a washer 16 associated with a bolt 11. This allows bolt 11 to be knocked in without removing its associated washer 16 and prevents the washer 16 from falling off when it and the moil guide 1 are removed from moil 9.

Figure 4:
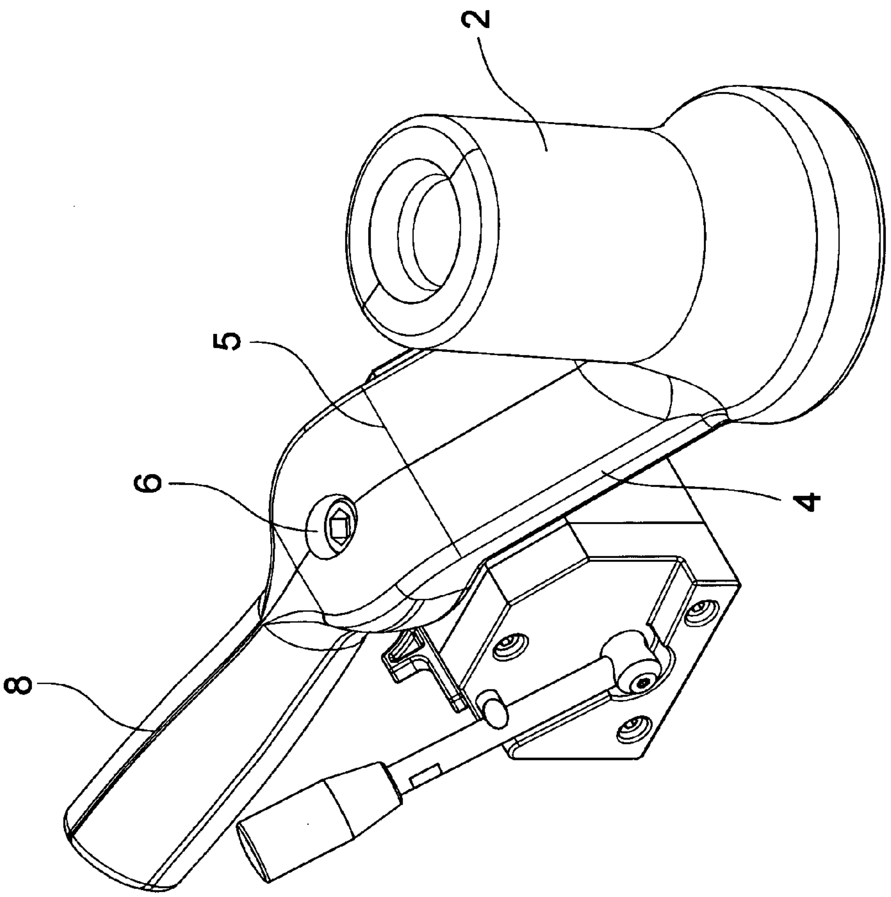
FIG. 4 shows a perspective view of a moil guide according to further embodiment of the invention.
Figure 5:
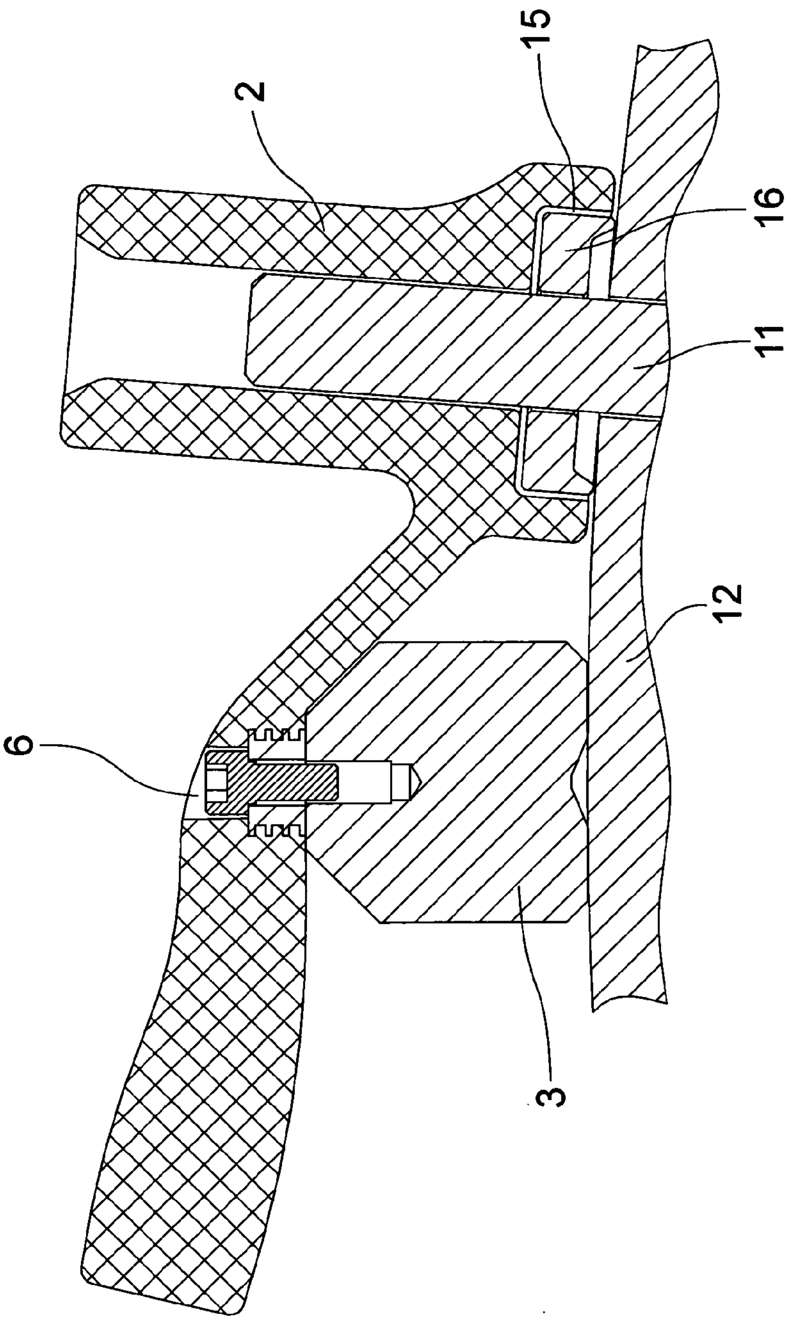
FIG. 5 shows a sectional side view of the moil guide shown in FIG. 4 removably attached to a face of a mill casing.

FIG. 4 shows a perspective view of a moil guide 20 according to a further embodiment of the invention and FIG. 5 shows a sectional side view of moil guide 10 removably attached to a face of a mill casing 12.

The embodiment shown in FIGS. 4 and 5 has sleeve 2, flexible membrane 4, attachment bracket 5 and handle 8 integrally formed from a polyurethane casting. The integrally formed components are attached to the mechanically activated magnet 3 by way of fasteners 6 as before.

Referring to FIG. 5 in particular, bolt 11 is located within sleeve 2 through an opening in the sleeve and an end of moil 9 is then able to be located through a distal opening of sleeve 2 as previously discussed.

The benefits and advantages of using moil guide 1 are:

That it removes the workman from the front of the linerbolt removal tool 10 which minimizes the possibility of injury to the workman including injury from shards flying from the moil or bolt;

It is not necessary to remove washer 16 prior to knocking out bolt 11; and

Reduces the time taken to remove bolts 11 due to secure alignment.

In the abovementioned preferred embodiment, the mechanically activated magnet 3 can be either commercially available device or specifically manufactured for the application. It should also be understood that whilst mechanically attachment magnet 3 in the above described embodiment is mechanically (lever) actuated by an operator/workman, it could in another not shown embodiment be some other form of magnetic attachment means activated in a different manner.

Furthermore, the magnetic attachment device may be in the form of an electronically activated magnet comprising a switch which is operable to selectively generate the magnetic field.

The sleeve 2 could be of any suitable engineering material, however, on the preferred embodiment it is made of a plastic material. Likewise, whilst flexible membrane 4 is preferably made of rubber, it should be understood that in other not shown embodiments, flexible membrane 4 may be made of other suitable material having dampening properties, or replaced by some other dampening means.

The invention claimed is:

1. A moil guide comprising:
   - a sleeve having an opening adapted to receive at least a portion of a bolt; and
   - a magnetic attachment device attached to the sleeve, the magnetic attachment device operable to selectively generate a magnetic field;
   - wherein, the magnetic attachment device is operable to selectively generate the magnetic field to removably attach the moil guide to a metal surface and the magnetic attachment device is attached to the sleeve by way of a flexible membrane.

2. The moil guide of claim 1, wherein the magnetic attachment device is mechanically activated to selectively generate the magnetic field to removably attach the moil guide to the metal surface.

3. The moil guide of claim 1, wherein the magnetic attachment device is an electronically activated magnet comprising a switch operable to selectively generate the magnetic field to removably attach the moil guide to the metal surface.

4. The moil guide of claim 1, the sleeve has a further opening adapted to receive a moil of a bolt removal tool.

5. The moil guide of claim 1 further comprising a recess in the sleeve proximal the opening.

6. A moil guide for guiding a hammer moil of a linerbolt removal tool onto a bolt to be removed from a liner secured to a mill casing, the moil guide comprising:
   - a sleeve connected to a magnetic attachment device by way of a flexible membrane;
   - wherein, the sleeve is placed over the bolt to provide a guide for the hammer moil and the magnetic attachment device is removably attached to the mill casing.

7. A method of removing a liner bolt from a liner secured to a mill casing, the method including the steps of:
   - locating an end of the liner bolt at least partially within a sleeve of a moil guide;
   - magnetically attaching the moil guide to the mill casing to thereby maintain the liner bolt at least partially within the sleeve of the moil guide;
   - locating a moil hammer within the sleeve through a further opening in the sleeve such that the moil hammer is in contact with the end of the liner bolt; and operating the moil hammer on the liner bolt to thereby drive the liner bolt from the liner and the mill casing.

* * * * *